United States Patent
Fujii et al.

[11] Patent Number: 5,906,044
[45] Date of Patent: May 25, 1999

[54] ULTRASONIC WELDING METHOD

[75] Inventors: Atsuhiko Fujii; Kazuhito Murakami, both of Nagoya, Japan

[73] Assignees: Harness System Technologies Research, Ltd., Nagoya; Sumitomo Wiring Systems, Ltd., Yokkaichi; Sumitomo Electric Industries, Ltd., Osaka, all of Japan

[21] Appl. No.: 08/760,340

[22] Filed: Dec. 4, 1996

[30] Foreign Application Priority Data

Dec. 6, 1995 [JP] Japan ................................ 7-317973

[51] Int. Cl.$^6$ ............................. H01R 43/02; H01R 4/00
[52] U.S. Cl. ................ 29/860; 29/868; 29/872; 174/84 R
[58] Field of Search ............................. 29/860, 872, 868; 174/84 R

[56] References Cited

U.S. PATENT DOCUMENTS 5,584,122 12/1996 Kato et al. .

FOREIGN PATENT DOCUMENTS 2844973 4/1980 Germany .
3428460 2/1986 Germany .

*Primary Examiner*—Carl J. Arbes
*Attorney, Agent, or Firm*—Oliff & Berridge, PLC

[57] ABSTRACT

The claimed invention provides an ultrasonic welding method, whereupon joint portions in which a copper foil portion and a twisted-wire electric cable are placed one upon the other in each groove of a resin casing, the grooves having a through-hole portion. In the through-hole portion, the copper foil portion and the twisted-wire electric cable are placed one upon the other. Welding is performed in a state in which the piled-up portion is sandwiched between a welding tip formed at an end of a welding head and an anvil. Thus, the joint portion between the copper foil portion and the twisted-wire electric cable invade and are invaded by a portion of the resin casing softened by welding heat. The joint portion is fastened not only by welding, but also by the solidified resin.

13 Claims, 5 Drawing Sheets

ULTRASONIC WELDING METHOD

BACKGROUND OF THE INVENTION

1. Field of the Invention

The present invention relates to an ultrasonic welding method for joining electric connection portions of single-core electric cables, twisted-wire electric cables, copper foils, etc.

2. Description of Related Art

Heretofore, the methods for joining electric connection portions of single-core electric cables, twisted-wire electric cables, copper foils, etc., included not only resistance welding but also ultrasonic welding. As shown in FIGS. 9 and 10, in a general ultrasonic welding apparatus, a welding head 12 is disposed at a forward end of a horn 1 projecting forward from an exciter unit U and downward from the horn 1, so that a top end of the welding head 12 serves as a welding tip (sonic pole) 11. An anvil 2 is provided so as to be opposite to the welding tip 11. In a situation where the subjects 13 are held between the welding tip 11 and the anvil 2, pressure is applied to the held portion and, at the same time, vibrational energy from an ultrasonic wave is applied to the welding tip 11 to make the welding tip 11 vibrate, thereby welding by vibrational heat (frictional heat) generated between the welding tip 11 and the subjects 13.

The ultrasonic welding has the advantage that no fragile product is generated in the joint portion between different kinds of metals. Consequently, a mother material is hardly damaged because the joining temperature is low compared with the resistance welding temperature. Thus, cost of welding is reduced.

The, ultrasonic welding, however, has a disadvantage that the adhesive strength, in particular the peel strength, is small compared with the resistance welding strength. This is because, in the case of the aforementioned ultrasonic welding apparatus 10, vibrational heat generated by the vibration of the welding tip 11 is local and low in energy so that the amount of heat is insufficient.

Having such an advantage as mentioned above, the ultrasonic welding method has been widely used for assembling various electronic parts. In recent years, however, with the increase in density of electronic parts used in a car, or the like, electric connection portions with higher reliability have been required. In particular, joined portions between terminals and electric wires, or the like, have been required to be fastened more securely.

SUMMARY OF THE INVENTION

It is therefore an object of the present invention to increase the adhesive strength at the joint between subjects carried out by ultrasonic welding, and particularly to increase the peel strength.

In order to solve the aforementioned problem, the present invention provides an ultrasonic welding method for joining electric connection portions of single-core electric cables, twisted-wire electric cables, copper foils, etc., where subjects to be welded are piled one upon the other, a resin is applied to the piled-up portion between the subjects across an interface of the subjects, and a pressing force and ultrasonic vibration are applied to the piled-up portion, whereby the subjects are joined by welding as well as by the application of the resin to the subjects.

According to the present invention, in an ultrasonic welding method for joining electric connection portions of single-core electric cables, twisted-wire electric cables, copper foils, etc., one subject to be welded and another subject to be welded are piled one upon the other, a resin is applied to the piled-up portion between the subjects across an interface of the subjects, and a pressing force and ultrasonic vibration are applied to the piled-up portion, whereby the subjects are joined by welding as well as by the application of the resin to the subjects. Thus, it is possible to obtain a weldment improved in adhesive strength, particularly in peel strength, compared with conventional methods.

DETAILED DESCRIPTION OF PREFERRED EMBODIMENTS

A first embodiment of the present invention is shown in FIGS. 1 through 5 in which the same parts as those in the prior art are referenced correspondingly, and the description about them is omitted here.

The first embodiment shows a case where copper foil portions of a flexible flat type electric cable are joined to twisted-wire electric cables. As to each of the twisted-wire electric cables, there is used an electric cable with a sectional area of 0.5 mm$^2$, which is obtained by twisting single-core wires.

Figure 1:
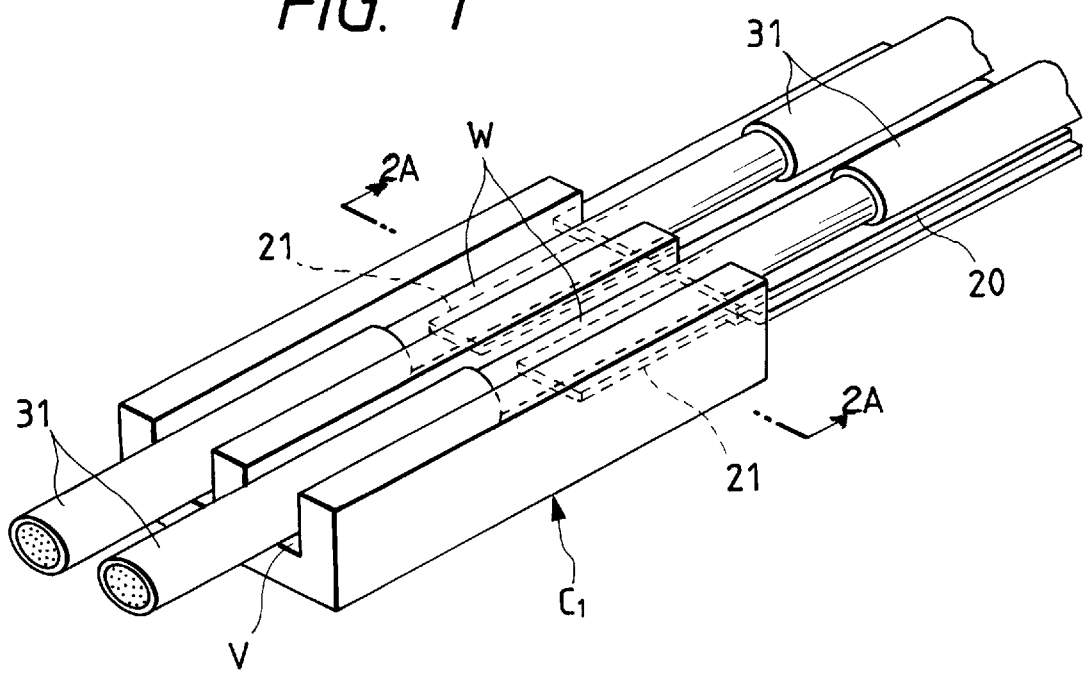
FIG. 1 is a perspective view showing a state in which joint portions of subjects to be welded are placed in a resin casing C1 in a first embodiment of the present invention.

As shown in FIG. 1, copper foil portions 21 and twisted-wire electric cables 31 are piled one upon the other in a resin casing C1 while lapped on each other. A welding operation (pressure and ultrasonic vibration) is then applied to the piled-up portions W thereof.

As shown in FIG. 1, the resin casing C1 has the shape of a rectangular parallelepiped in which two stripes of grooves V with a predetermined depth are provided in parallel to each other in the longitudinal direction. The respective piled-up portions W of the copper foil portions 21 and the twisted-wire electric cables 31 are fitted into portions of the grooves V. The resin casing C1 is formed from polyvinyl chloride (PVC).

Figure 2A:
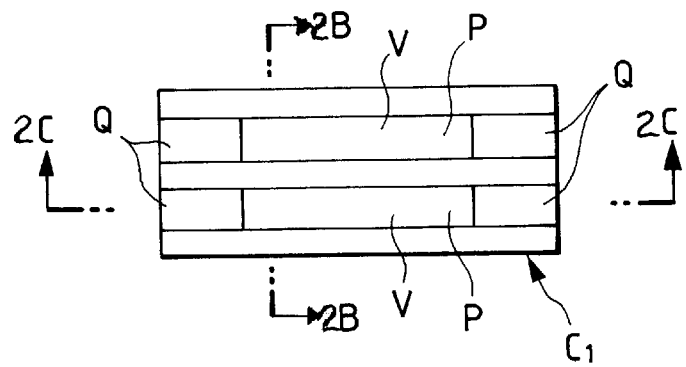
FIGS. 2A–2C show three views as seen from three directions, further showing the resin casing C1 used in the first embodiment with FIG. 2B being a cross-section along line B—B in FIG. 2A and FIG. 2C being a cross-section along line C—C in FIG. 2A.
Figure 2B:
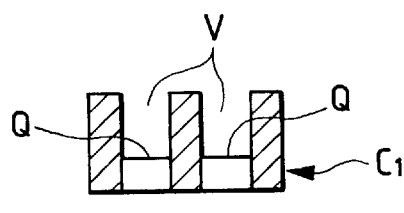
Figure 2C:
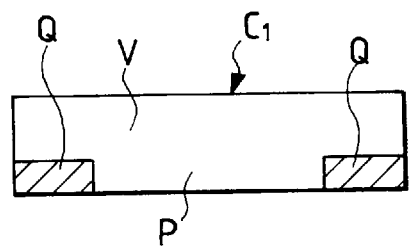

The resin casing C1 is shown in FIGS. 2A–2C, in which FIG. 2A is a plan view, FIG. 2B is a sectional view taken along the line B—B in FIG. 2A, and FIG. 2C is a sectional view taken along the line C—C in FIG. 2A. Referring to FIGS. 2A–2C, the shape of the resin casing C1 will be described below more in detail.

As shown in FIG. 2A, each of the grooves V is lengthwise separated into three regions; a central region and side regions on the both sides of the central region. The depth of each of the side regions is limited to a predetermined depth, so that the bottom surfaces of the grooves V at these side regions form mount surfaces Q on which the copper foil portions 21 and the twisted-wire electric cables 31 are piled one upon the other. As shown in FIGS. 2A and 2B, the center regions P of the respective grooves V are formed as through-holes.

Figure 3:
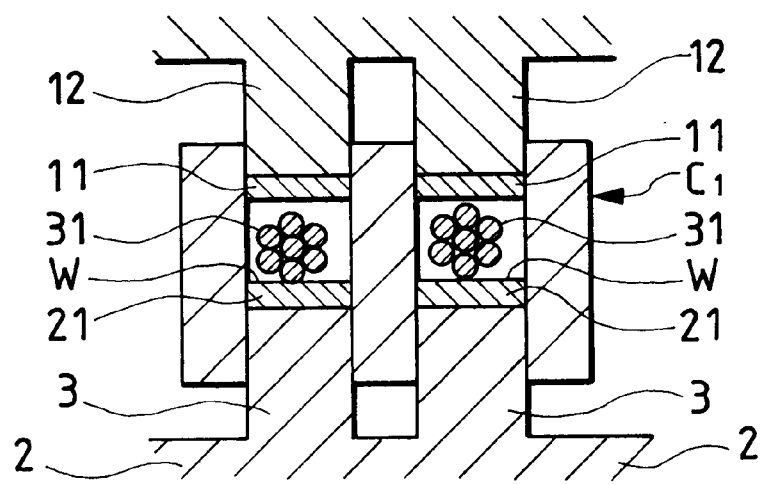
FIG. 3 is a sectional view taken along the line A—A in FIG. 1, showing the relation of the arrangement between a welding tip and an anvil.

When welding is to be carried out, as shown in FIG. 3, the through-hole central regions P of the casing C1 are fitted onto projection stripes 3 of an anvil 2, so that the bottom surface of the casing C1 is mounted on a not-projected surface of the anvil 2. Then, the copper foil portions 21 and the twisted-wire electric cables 31 are placed on the mount surfaces Q so that the copper foil portions 21 and the twisted-wire electric cables 31 are piled one upon the other at the through-hole central regions P respectively.

Then, as shown in FIG. 3, the welding head 12 is inserted from above into the groves V toward the through-hole central regions P so that the piled-up portions W of the copper foil portions 21 and the twisted-wire electric cables 31 are sandwiched between welding tips 11 formed on the top end of the welding head 12 and the projection stripes 3 of the anvil 2 respectively.

Figure 4:
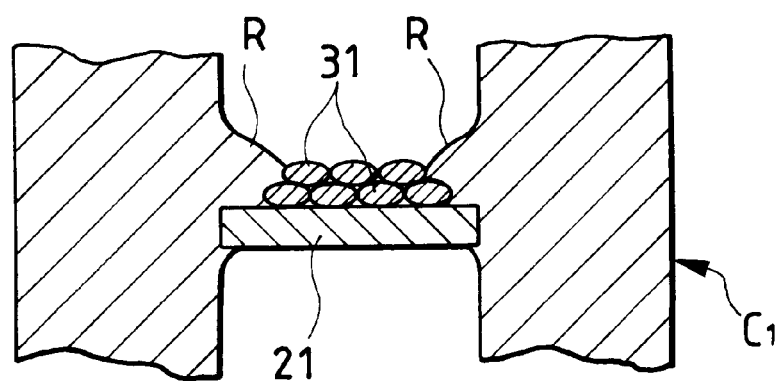
FIG. 4 is a typical view showing the result of welding according to the first embodiment.

When ultrasonic welding is performed in the aforementioned state, the twisted-wire electric cables 31 are pressed and squeezed and, at the same time, the respective joint portions W of the twisted-wire electric cables 31 and the copper foil portions 21 invade and are invaded by portions R of the resin casing C1 which is softened by welding heat so that the joint portions W are fastened not only by welding but also by the resin after solidified, as shown in FIG. 4.

Figure 5:
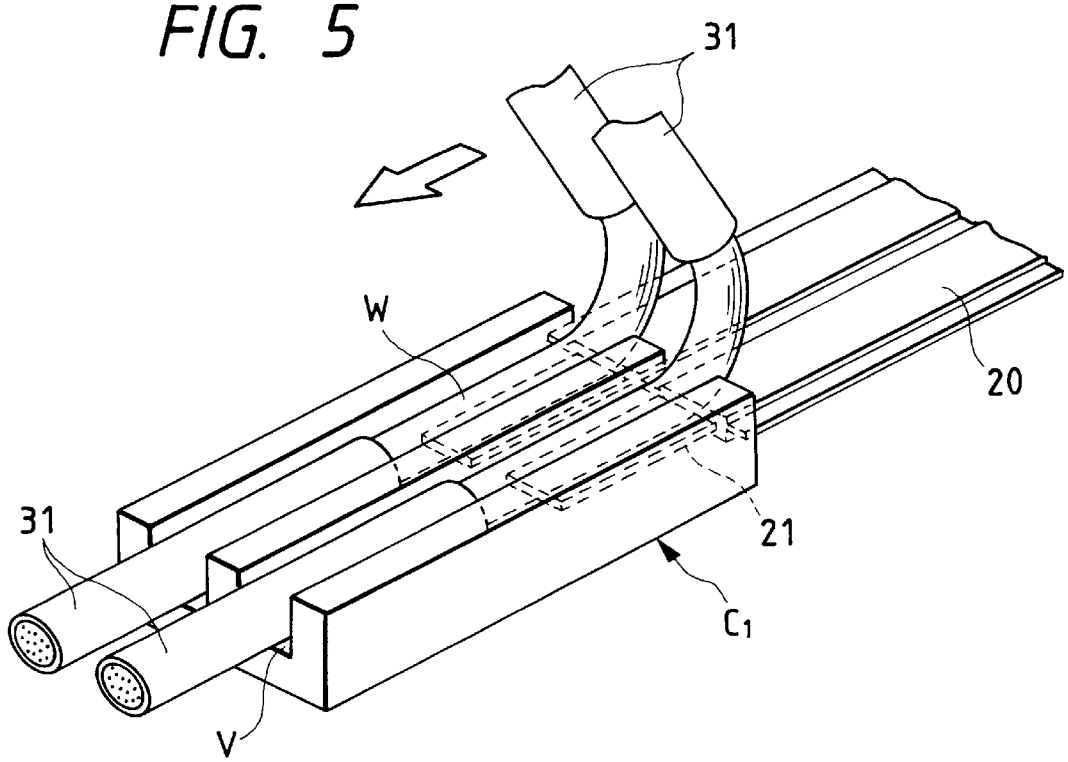
FIG. 5 is a perspective view showing a welding strength test in the first embodiment.

A load in a direction of peeling of the twisted-wire electric cables 31, as indicated by the arrow in FIG. 5, was applied to the joint portions W between the copper foil portions 21 and the twisted-wire electric cables 31 which had been piled one upon the other in the resin casing C1 and subjected to ultrasonic welding to thereby examine the peel strength of the twisted-wire electric cables at the joint portions W.

The result of the test in this case, together with the result of the test in the conventional case, where the subjects 13 to be welded were joined to each other only by ultrasonic welding, is shown in Table 1. The peel strength was measured as a critical load at the time of peeling at the joint portions W between the copper foil portions 21 and the twisted-wire electric cables 31. The critical load was taken as a value obtained by averaging values measured in all testing measurements. The standard deviation $\tau_1$ in the testing measurements is shown additionally in Table 1. Fifty testing measurements were performed for both the first embodiment and the conventional example.

TABLE 1

|  | First Embodiment of the Invention | Conventional Example |
| --- | --- | --- |
| Peel Strength X (Newtons) | 2.5 | 1.2 |
| Standard Deviation $\sigma_1$ | 0.2 | 0.6 |

As is seen in Table 1, the joint portions W in the first embodiment endured an average load of 2.5 Newtons in 50 testing measurements. Furthermore, the peel strength at the joint portions W was remarkably improved compared with the conventional example in which the joint portions W could not endure more than the average load of 1.2 Newtons in the same number of testing measurements.

With respect to the standard deviation $\tau_1$, a stable result (small in scatter) of the peel strength value was obtained in this embodiment because the standard deviation $\tau_1$ in the method of this embodiment was 0.2 whereas the standard deviation $\tau_1$ in the conventional example was 0.6.

Figure 6:
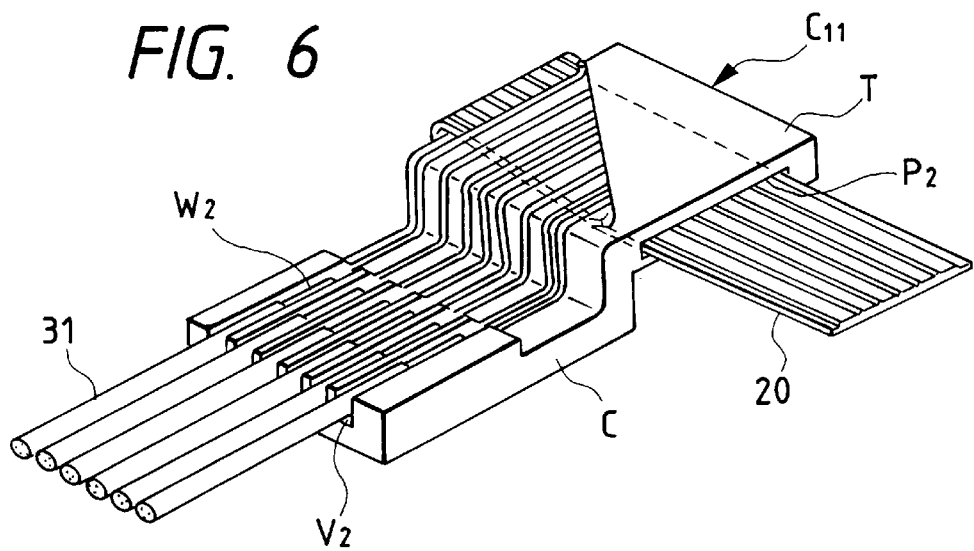
FIG. 6 is a perspective view showing another resin casing C11 in the first embodiment and showing subjects placed therein.

Incidentally, a corner portion of the flexible flat-type electric cable 20 may be formed in the vicinity of the joint portions W2 by using a resin casing C11 having such a shape as shown in FIG. 6. As shown in FIG. 6, the resin casing C11 has a casing portion C, a step portion, and an upper stage portion T. The casing portion C has a grooved portion and an extension portion extended from the grooved portion. In the grooved portion of the casing C, a plurality of grooves V2 are formed in the same manner as the grooves V provided in the aforementioned resin casing C1 and the extension portion is extended from the grooved portion in the direction of arrangement of the grooves V2. The step portion is formed at the end of the extension portion so as to be perpendicular to the extension portion. The upper stage portion T is formed to follow the step portion so as to be parallel to the casing portion C, and a rectangular through-hole P2 is formed through the upper stage portion T in the direction perpendicular to the longitudinal direction of the grooves V2.

With respect to the resin casing C11, exposed copper foil portions 21 of the flexible flat-type electric cable 20 are piled upon the twisted-wire electric cables 31 respectively in the corresponding grooves V2 of the casing portion C, whereas the end portion of the flexible flat-type electric cable 20, where the copper foil portions 21 are not exposed but coated with resin, is moved to the upper stage portion T along the upper surface of the extension portion of the casing portion C. The flexible flat-type electric cable 20 is bent perpendicularly on the upper surface of the upper stage portion T, inserted into the rectangular hole P2 from its one end on one side surface of the upper stage portion T, and extended out from the other end of the rectangular through hole T on the opposite side surface of the upper stage portion T. Thus, the corner portion of the flexible flat-type electric cable 20 is formed.

A second embodiment of the present invention will be described below with reference to FIGS. 7A and 7B and FIG. 8.

Figure 7A:
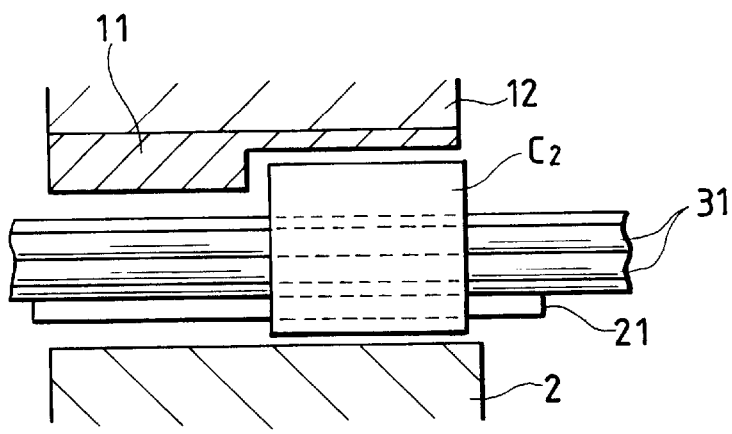
FIGS. 7A and 7B are views showing a second embodiment of the present invention.
Figure 7B:
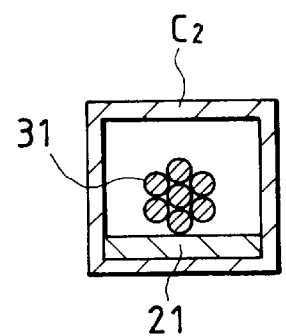

As shown in FIGS. 7A and 7B, in the second embodiment, a rectangular-pipe-shaped resin casing C2 is formed so that a copper foil portion 21 and a twisted-wire electric cable 31 are inserted in the inside of the resin casing C2 and arranged so as to be piled one upon the other in the inside of the resin casing C2. The twisted-wire electric cable is the same as that used in the preceding embodiment such that the single-core wires thereof are twisted so as to have a sectional area of 0.5 mm². FIG. 7B shows a section of the resin casing C2 in a state where the copper foil portion 21 and the twisted-wire electric cable 31 are piled one upon the other before welding. The resin casing C2 is formed from polyvinyl chloride (PVC).

As shown in FIG. 7A, the resin casing C2 is sandwiched between a welding tip 11 provided on an end of a welding head 12 and an anvil 2, and the piled-up portion W of the copper foil portion 21 and the twisted-wire electric cable 31 are welded together within the resin casing C2.

Figure 8:
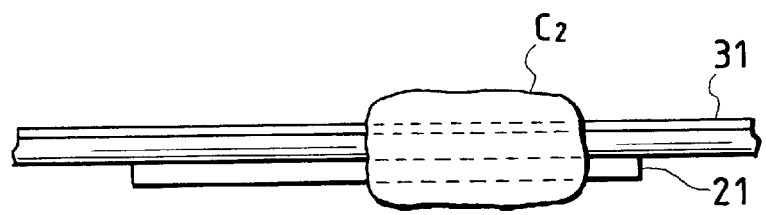
FIG. 8 is a typical view showing the result of welding according to the second embodiment.
Figure 9:
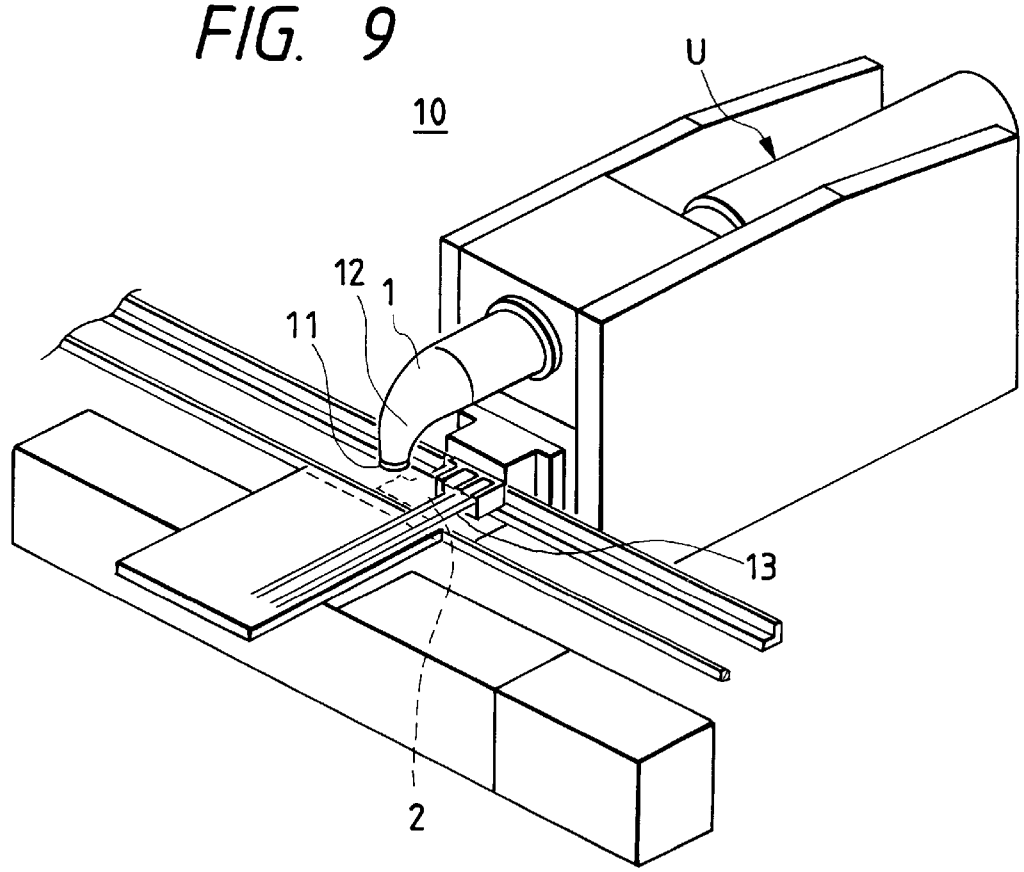
FIG. 9 is a perspective view showing an ultrasonic welding apparatus.
Figure 10:
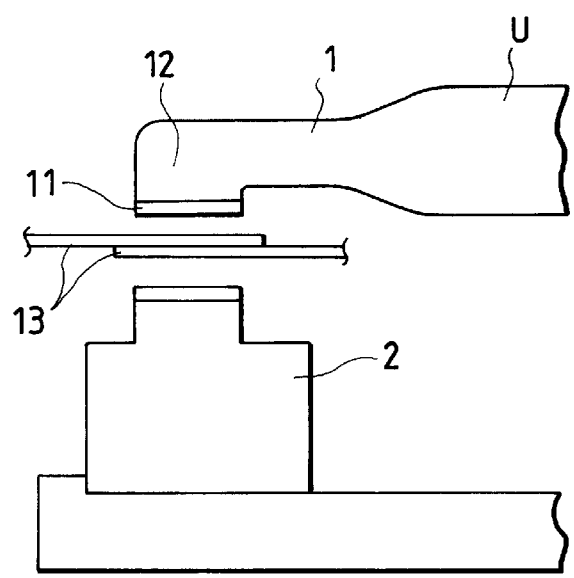
FIG. 10 is a view showing a main part of a conventional ultrasonic welding apparatus.

Thus, as shown in FIG. 8, the joint portions of the twisted-wire electric cable 31 and the copper foil portions 21 which are joined to each other by welding are invaded by portions of the resin casing C2 softened by welding heat. Furthermore, the resin casing C2 is softened as a whole to envelop the joint portions entirely. Accordingly, the weld is made more secure when the resin casing C2 is solidified.

The same test as the test in the previous embodiment was applied to the second embodiment. The results are shown in Table 2.

TABLE 2

| | Second Embodiment of the Invention | Conventional Example |
|---|---|---|
| Peel Strength X (Newtons) | 5.6 | 1.2 |
| Standard Deviation $\sigma_1$ | 0.4 | 0.6 |

As is understood from Table 2, the joint portions in the second embodiment endured an average load of 5.6 Newtons in 50 testing measurements. Furthermore, the peel strength was remarkably improved compared with not only the conventional example, in which the joint portions W could not endure the average load of 1.2 Newtons in the same number of testing measurements, but also with the case (averaged peel strength of 2.5 Newtons) of the first embodiment. This is so because, unlike the first embodiment, the joint portions are covered as a whole with the resin casing C2.

With respect to the standard deviation, the standard deviation $\tau_2$ in the second embodiment was 0.4, whereas the standard deviation $\tau_2$ in the conventional example was 0.6. A stable result (small in scatter) was therefore obtained.

Incidentally, it is a matter of course that the shape of the resin casing C2 is not limited to a rectangular pipe. For example, the casing C2 may be shaped like a triangular pipe. Preferably, the external shape of the casing C2 should provide for a small space remaining in the casing when the joint portions are placed in the casing. Furthermore, the external shape is formed so as to be along the space sandwiched between the welding tip and the anvil. The resin casing C2 is attached to the contact surface between the welding tip and the anvil without any gap, thus providing not only a stable fixture at the time of welding, but also minimizing heat dissipation.

Although the two aforementioned embodiments have shown the case where a twisted-wire electric cable 31 is used as one of the subjects to be welded, the peel strength is improved in the same manner as described above even in the case of a single-core cable composed of one conductor.

What is claimed is:

1. An electrical connection creating apparatus for joining electrical connection portions of electric cables, comprising:
    means for placing one electrical connection portion to be welded on another electrical connection portion to be welded so as to create an interface;
    means for seating the electrical connection portions in a resin casing;
    means for applying a pressing force and ultrasonic vibrations directly to said electrical connection portions such that said electrical connection portions are welded together to form a weld joint and said resin casing is softened so as to envelope at least a portion of each of said electrical connection portions and invade said weld joint.

2. An electrical connection, comprising:
    a first electrical connection portion having a first exposed portion;
    a second electrical connection portion having a second exposed portion overlapping the first exposed portion; and
    a resin casing for receiving the overlapped first and second exposed portions, the first electrical connection portion being welded to the second electrical connection portion and the resin casing being softened to at least partially enclose the overlapped first and second exposed portions by an ultrasonic welder.

3. The electrical connection according to claim 2, wherein the resin casing is a planar member having at least one groove for receiving a set of the first electrical connection portion and the second electrical connection portion.

4. The electrical connection according to claim 2 wherein the resin casing is a tubular member.

5. The electrical connection according to claim 4, wherein the tubular member has an annular cross section.

6. The electrical connection according to claim 4, wherein the tubular member has a polygonal cross section.

7. The electrical connection according to claim 4, wherein the tubular member has a rectangular cross section.

8. An ultrasonic welding method for joining electrical connection portions of electric cables, comprising the steps of:
    placing one electrical connection portion to be welded on another electrical connection portion to be welded so as to create an interface;
    seating the electrical connection portions in a resin casing; and
    applying a pressing force and ultrasonic vibrations directly to said electrical connection portions such that said electrical connection portions are welded together to form a weld joint and said resin casing is softened so as to envelope at least a portion of each of said electrical connection portions and invade said weld joint.

9. The ultrasonic welding method of claim 8, wherein said electrical connection portions are seated in a groove in said resin casing such that said electrical connection portions are disposed in a substantially collinear overlying arrangement with respect to each other.

10. The ultrasonic welding method of claim 8, wherein the weld joint is only partially enveloped by said resin casing.

11. An ultrasonic welding method for joining electrical connection portions of electric cables to form an electrical connection, comprising the steps of:
    providing a first electrical connection portion having a first exposed portion;

providing a second electrical connection portion having a second exposed portion;

overlapping the first exposed portion with the second exposed portion;

placing the overlapped first and second exposed portions in a resin casing; and welding the first exposed portion directly to the second exposed portion to form a weld joint using an ultrasonic welder such that the resin casing is softened to at least partially enclose the overlapped first and second exposed portions and to invade the weld joint so as to form an electrical connection.

12. The ultrasonic welding method of claim 11, wherein the first and second electrical connection portions are seated in a groove in said resin casing such that said first and second exposed portions are disposed in a substantially collinear overlying arrangement with respect to each other.

13. The ultrasonic welding method of claim 11, wherein the weld joint is only partially enclosed by said resin casing.

* * * * *